April 10, 1956 C. W. THOMAS 2,741,725
HEADLIGHT CONTROL
Filed Sept. 25, 1952
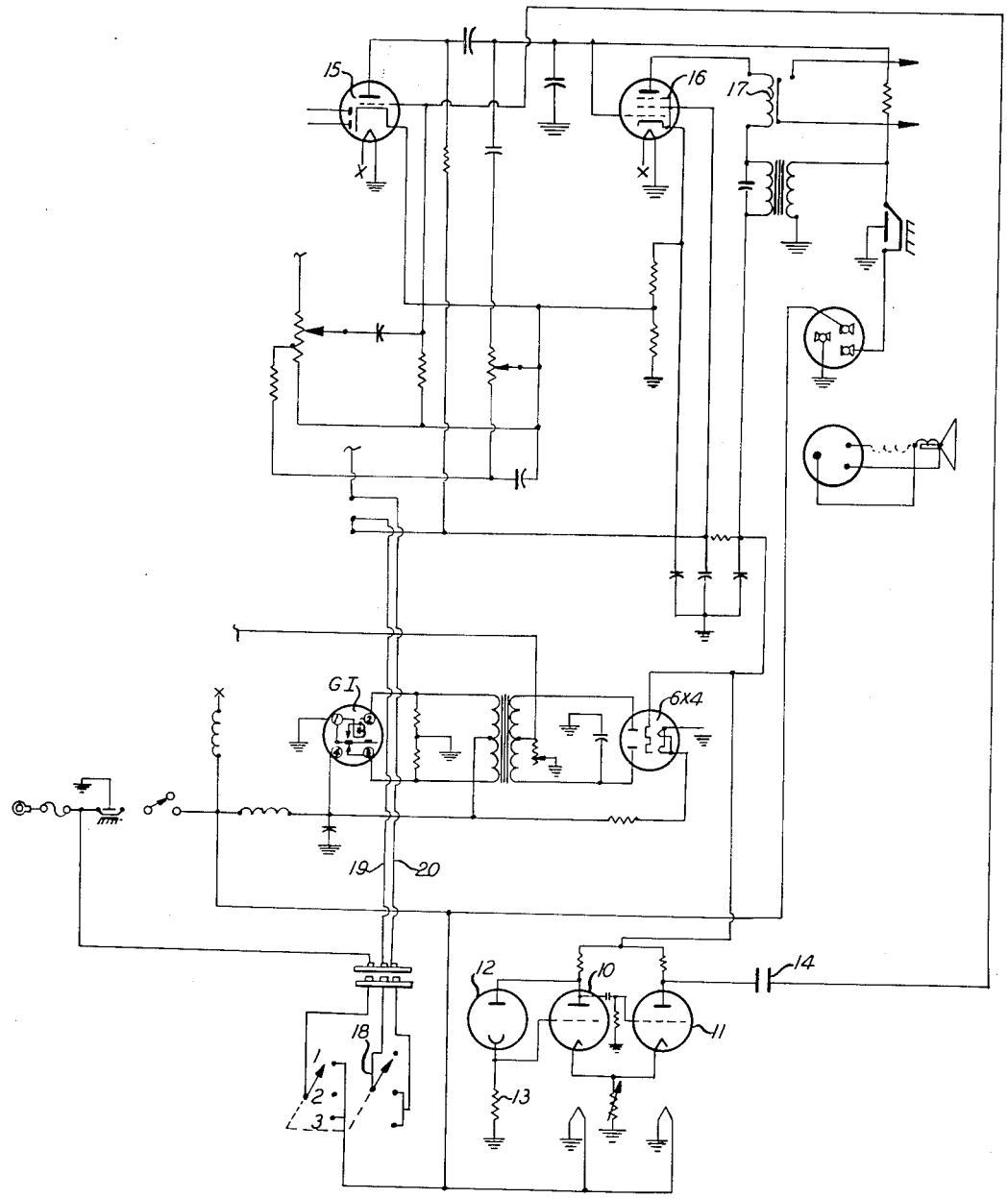
C. W. THOMAS
INVENTOR.
BY E. C. McRae
J. C. Faulkner
D. H. Oster
ATTORNEYS United States Patent Office 2,741,725
Patented Apr. 10, 1956

2,741,725

HEADLIGHT CONTROL

Charles W. Thomas, Dearborn, Mich., assignor to Ford Motor Company, Dearborn, Mich., a corporation of Delaware Application September 25, 1952, Serial No. 311,501

5 Claims. (Cl. 315—83)

This application is concerned with the automotive field and more particularly with an apparatus for automatically and economically controlling motor vehicle headlights as to their inclination to the horizontal.

A demand has arisen in recent years for a device capable of automatically dimming vehicle headlights in response to the approach of oncoming vehicles and other road conditions. Such devices are now commercially available and are very satisfactory in their operation. However, the fact that such devices have required a photo cell and a photo cell amplifier with the resultant necessary high voltage direct current plate supply has raised the cost to a point where the market is greatly restricted. This invention has been perfected in an effort to lower the cost of such a device as applied to the usual motor vehicle.

This invention is best understood by reference to the drawing which is a schematic circuit diagram of one facet of the invention.

This invention comprises the combination of the radio receiver conventionally installed in motor vehicles combined with a headlight dimmer in such a manner that the cost chargeable to the headlight dimmer per se is decidedly reduced. In the figure the ordinary 300 volt direct current plate power source employed in automobile receivers has been shown consisting of vibrator G1, rectifier tube 6X4 and the associated resistances, chokes and capacitors. The sole purpose of this circuit is to transform the six volt storage battery current of an automobile battery to a source of smooth high voltage direct current suitable for the plate supply of vacuum tubes.

Associated with the headlight dimmer of this invention is an oscillator, the purpose of which will become apparent as the description proceeds. This oscillator may be any of a large number of known oscillators but the preferred type is that shown, a common cathode multivibrator. This comon cathode multivibrator comprises triode 10 and triode 11 connected as shown in the drawing. These triodes may be separate tubes or the elements of both may be included in a common envelope. A photoelectric cell 12 is connected in this circuit with the cathode connected directly to the grid of triode 10 and connected to ground through resistance 13. The plates of triode 10, triode 11 and photoelectric cell 12 are all connected to and energized from the high voltage plate supply of the radio receiver. A multivibrator of the type shown in the drawing will oscillate only so long as the grid of triode 10 is raised substantially above ground potential due to the flow of current engendered in photo cell 12 by the incidence of light thereupon. The constants of the multivibrator circuit are selected so that the frequency of oscillation is comfortably above the sonic range, i. e., a frequency in the neighborhood of 20,000 cycles per second or somewhat higher.

The output of the multivibrator circuit is taken off through capacitor 14 and impressed on the control grid of vacuum tube 15 which is the first audio frequency amplifier in the automobile radio receiver. As a result of this connection the incidence of light upon photoelectric cell 12 causes the alternating output of the multivibrator to be impressed upon the control grid of vacuum tube 15 and to be amplified through this tube and through power amplifier vacuum tube 16. The plate supply of power amplifier tube 16 is shunted through the armature of frequency sensitive relay 17 which in turn actuates the headlight dimmer. Inasmuch as the frequency of the multivibrator is in the supersonic range of the amplifying system of the radio receiver can simultaneously handle the ordinary broadcast material and the output of the multivibrator without introducing unwanted sounds into the loud speaker.

It is essential that switching means be provided whereby the operator of the vehicle may at will use the radio receiver or the headlight dimmer, or both. This is accomplished by the three pole, three throw switch 18. When this switch 18 is in position 1 the headlight dimmer only will operate. The radio receiver will not operate because switch 18 has interrupted the connection between conductor 19 and conductor 20 so that no plate supply reaches the vacuum tubes prior to vacuum tube 15. This portion of the radio has not been shown, but it ordinarily comprises a radio frequency amplifier, a converter tube and an intermediate frequency amplifier.

In the second position of the switch 18, the radio receiver only is operated. This is because in position 2 the heaters of triodes 10 and 11 are disconnected from their source of energy.

Similarly, in position 3, both the headlight dimming apparatus and the radio receiver function simultaneously with the amplified output of the multivibrator functioning to operate frequency sensitive relay 17 and control the headlights without the introduction of undesired interference in the radio receiver. It is, of course, to be understood that the multivibrator is active only when excited by the electro motive source generated when light impinges upon photo cell 12.

I claim as my invention:

1. In a motor vehicle, a source of high voltage direct current plate supply, a radio receiver operated from this plate supply, a separate oscillator operating from said plate supply and in the supersonic range, photo-cell means controlling the separate supersonic oscillator, common amplifying means associated with both the radio receiver and separate oscillator, and a headlight control apparatus, said headlight control including a tuned relay responsive only to the amplified output of the separate oscillator.

2. In a motor vehicle, a source of high voltage direct current plate supply, a radio receiver, a separate oscillator and a photoelectric tube all energized from said plate supply, said photo-electric tube controlling the separate oscillator, common amplifying means associated with both the radio receiver and oscillator, and a headlight control, said oscillator operating in the supersonic range and said headlight control including a tuned relay responsive only to the amplified output of said separate oscillator.

3. In a motor vehicle, a source of high voltage direct current plate supply, a radio receiver, a separate oscillator and a photo-electric tube all energized from said plate supply, common amplifying means associated with both the radio receiver and oscillator, and a headlight control, said oscillator operating in the supersonic range and being controlled by said photoelectric cell, and said headlight control including a tuned relay responsive only to the amplified output of said separate oscillator.

4. In a motor vehicle, a source of high voltage direct current plate supply, a radio receiver, a common cathode multivibrator oscillator and a photoelectric tube all energized from said plate supply, said photo-electric tube controlling the separate oscillator, common amplifying means associated with both the radio receiver and multivibrator, and a headlight control, said multivibrator operating in the supersonic range and being controlled by said photoelectric cell, said headlight control including a tuned relay responsive only to the amplified output of said miltivibrator oscillator.

5. In a motor vehicle, a source of high voltage direct current plate supply, a radio receiver and a separate oscillator operated from this plate supply and functioning in the supersonic range, amplifying means common to said radio receiver and said oscillator, the amplified output of said oscillator serving to actuate an electric control means.

References Cited in the file of this patent

UNITED STATES PATENTS

| | | |
|---|---|---|
| 2,268,792 | Andrews | Jan. 6, 1942 |
| 2,476,389 | Schmidt | July 19, 1949 |
| 2,558,969 | LeCroy | July 3, 1951 |
| 2,560,748 | Silva | July 13, 1951 |